Figure 1:
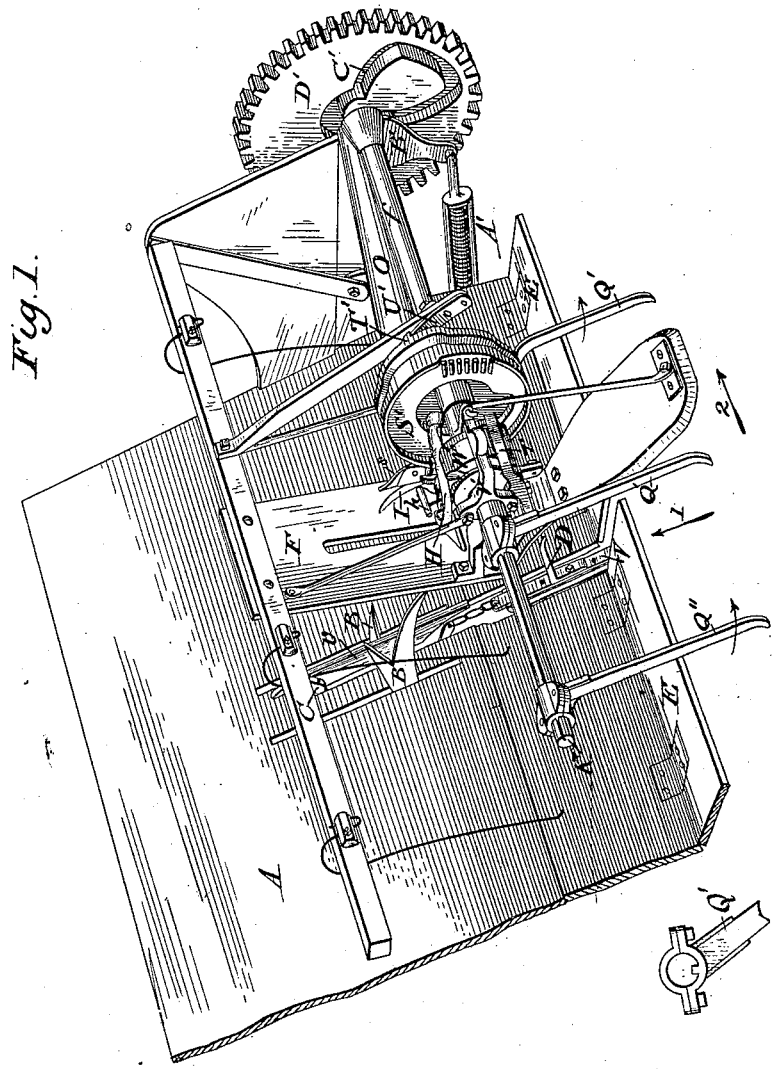

(Model.)

5 Sheets—Sheet 1.

G. ESTERLY.
GRAIN BINDING MACHINE.

No. 266,254. Patented Oct. 17, 1882.

Attest.
Sidney P. Hollingsworth
Newton Wyckoff.

Inventor.
George Esterly
By his Atty
Philip T. Dodge (Model.)

5 Sheets—Sheet 2.

G. ESTERLY.
GRAIN BINDING MACHINE.

No. 266,254.    Patented Oct. 17, 1882.

Attest.
Sidney P. Hollingsworth
Newton Wyckoff.

Inventor.
Geo. Esterly,
By his Atty.
Philip T. Dodge.

(Model.)

5 Sheets—Sheet 3.

G. ESTERLY.
GRAIN BINDING MACHINE.

No. 266,254.

Patented Oct. 17, 1882.

Attest.
Sidney P. Hollingsworth
Newton Wyckoff.

Inventor.
George Esterly
By his Atty
Philip T. Dodge.

(Model.)

5 Sheets—Sheet 4.

G. ESTERLY.
GRAIN BINDING MACHINE.

No. 266,254.

Patented Oct. 17, 1882.

Attst.
Sidney P. Hollingsworth
Newton Wyckoff.

Inventor.
George Esterly
By his atty.
Philip T. Dodge.

(Model.)

5 Sheets—Sheet 5.

G. ESTERLY.
GRAIN BINDING MACHINE.

No. 266,254.

Patented Oct. 17, 1882.

Attest.
Sidney P. Hollingsworth
Harry Shipley

Inventor.
George Esterly
By Philip T. Dodge
Atty

UNITED STATES PATENT OFFICE.

GEORGE ESTERLY, OF WHITEWATER, WISCONSIN.

GRAIN-BINDING MACHINE.

SPECIFICATION forming part of Letters Patent No. 266,254, dated October 17, 1882.

Application filed March 29, 1882. (Model.)

*To all whom it may concern:*

Be it known that I, GEORGE ESTERLY, of Whitewater, in the county of Walworth and State of Wisconsin, have invented certain Improvements in Grain-Binding Machines, of which the following is a specification.

This invention relates more particularly to improvements in that class of grain-binders represented in all their essential features in the patent to Appleby, No. 212,420, machines of this type being now made in an extensive scale, and being familiar to all persons skilled in the art.

The improvements consist mainly in the peculiar manner of constructing the frame upon which the operating parts of the binder are mounted; in the construction and arrangement of the compressing devices, the compressor being actuated by a hub on the binder-arm shaft independently of the binder-arm; in devices for starting the machine automatically when a sufficient amount of grain has accumulated to form a bundle, consisting essentially in the combination of the sliding plate provided with arms against which the grain is compressed, and a rock-shaft provided with arms connected respectively with the sliding plate and the trip mechanism of the driving-gear; also, in the peculiar construction of the frame in which the knot-tyer head is sustained, consisting mainly in providing the frame with an opening to receive the tyer-pinion, whereby I am enabled to give the same support to both sides, and thus reduce the same in size, so as not to interfere with the proper action of the other parts; also, in operating the clamping-head by means of a ratchet-lever driven by a cam-wheel having a groove in its periphery, as hereinafter explained; also, in a stop-spring arranged to engage with a shoulder on the main cam-wheel of the binder to prevent the delivery-arms from moving backward accidentally; also, in operating the arm for taking up the cord by means of the cam employed to operate the trip mechanism; also, in attaching the operating-arm of the trip mechanism to the shaft in a peculiar manner, whereby its removal is permitted without disconnecting or removing other parts, as heretofore required; also, in the peculiar manner of attaching the spring which co-operates with the twister-head to admit of the tension being varied and maintained more effectively than under the ordinary construction of the parts; also, in providing the machine with an additional delivery-arm designed to act at the heads of the grain to facilitate the construction and discharge of the same, and in minor details which will be hereinafter explained.

Figure 2:
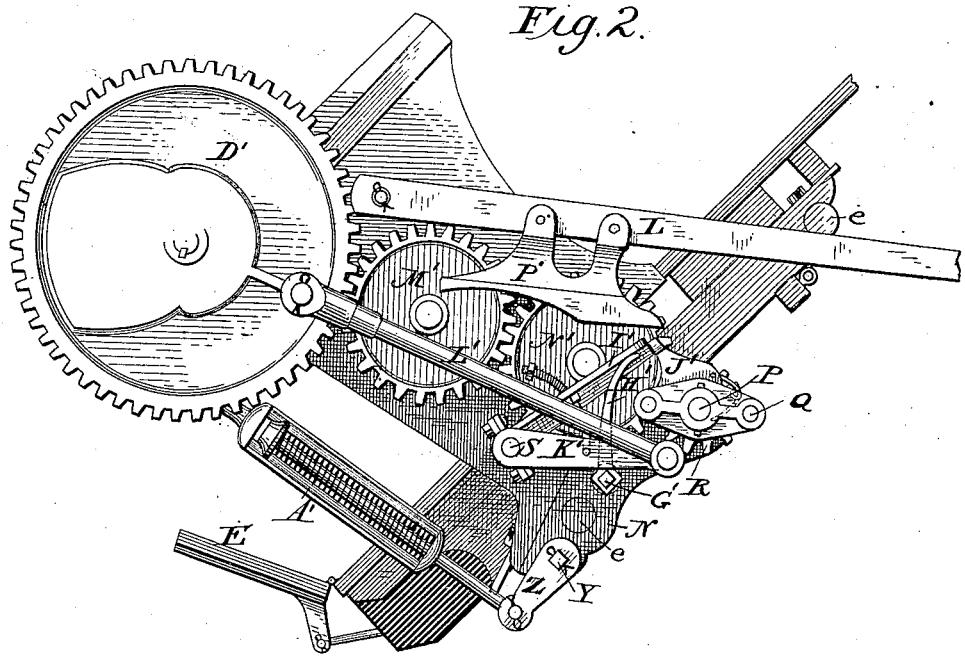
Figure 5:
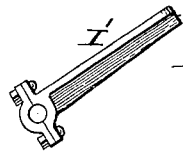
Figure 4:
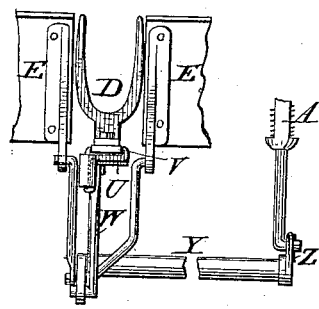
Figure 3:
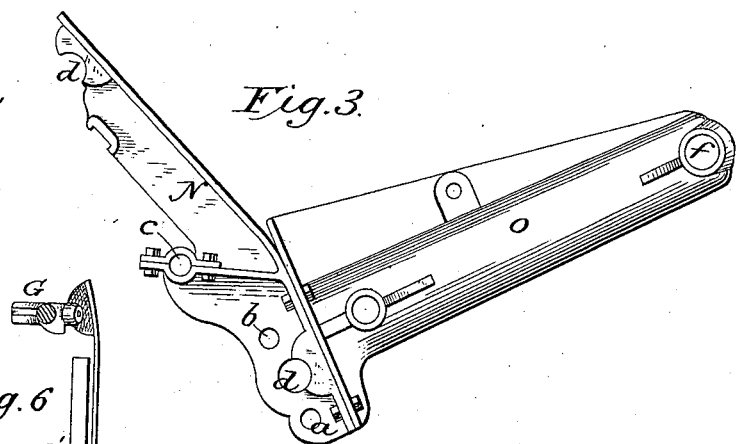
Figure 6:
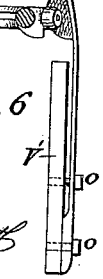
Figure 7:
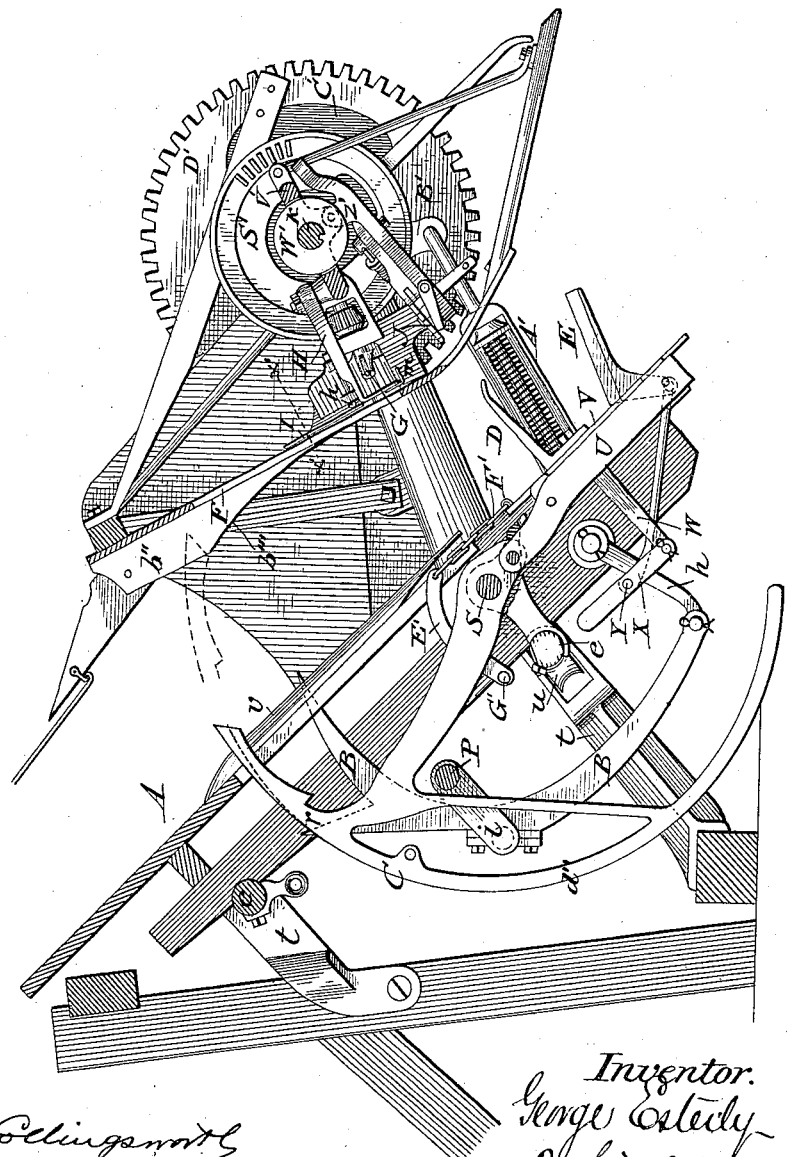
Figure 8:
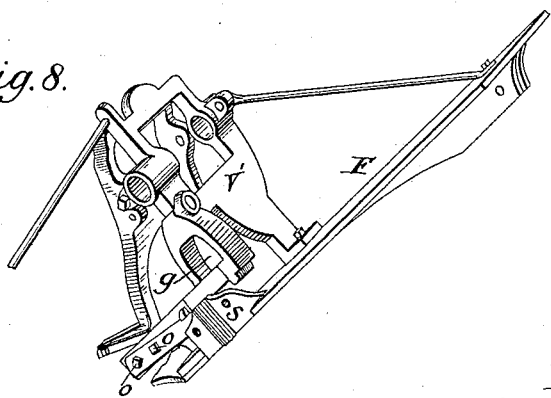
Figures 10, 11:
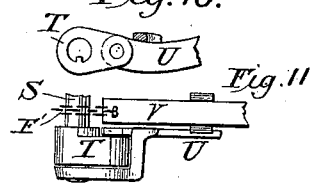
Figure 9:
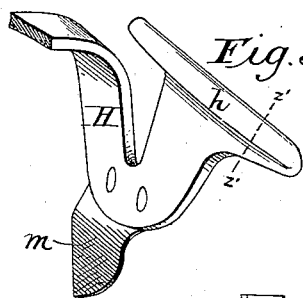
Figure 13:
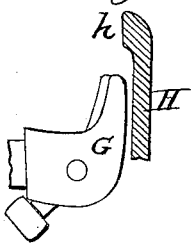
Figure 12:
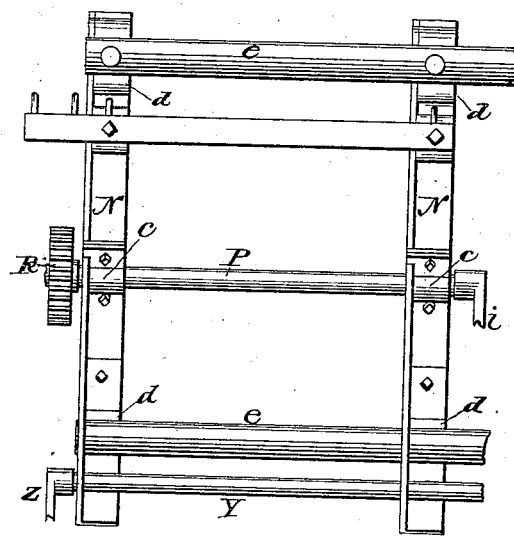
Figure 14:
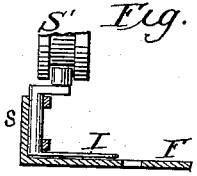
Figure 15:
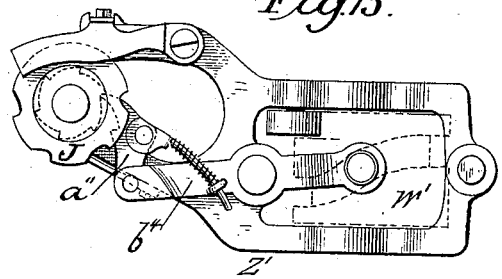

Referring to the accompanying drawings, Figure 1 represents a perspective view of the well-known Appleby binder having my improvements incorporated therein. Fig. 2 is an end elevation of the same, looking against the forward end. Fig. 3 is an end elevation of the binder-frame. Fig. 4 is a view, looking edgewise against the lower side of the binding-table, in the direction indicated by the arrow 1, showing the compressing and trip mechanism. Fig. 5 is a view showing the construction of the trip-arm. Fig. 6 is a view showing the manner in which the spring is applied to operate in connection with the tyer-head. Fig. 7 is a vertical cross-section of the machine past the side of the binder-arm, looking in the direction indicated by the arrow 2 in Fig. 1. Fig. 8 is a perspective view of the frame in which the cord clamping and cutting devices are mounted, together with the breast-plate on which the same is sustained. Fig. 9 is a perspective view, showing one end of the knife-bearing and cord-supporting arm. Fig. 10 is a vertical section illustrating the manner in which the compressor-arms are connected with the operating-shaft. Fig. 11 is a top plan view of the same. Fig. 12 is a bottom plan view of the binder-frame. Fig. 13 is a section on the line $z'\ z'$, Fig. 9. Fig. 14 is a section on the line $x'\ x'$, Fig. 7, showing the breast-plate and tucker-arm. Fig. 15 is a top plan view, and Fig. 16 a side elevation, illustrating the devices by which the cord-clamping wheel is rotated.

As regards its general construction and mode of operation, the machine represented in the drawings is similar to that described in the Appleby patent before alluded to. The essential members of the machine are as follows: an inclined binding-table, A, upon which the loose grain is received and bound; packer-arms B, which have an orbital movement through and above the face of the table for the purpose of feeding and compacting the grain to form the bundles; a vibratory binder-arm, C, by means of which the cord is passed around the bundle and delivered to the tying devices; compressor-arms D, which serve to sustain the grain while being compacted, and also as a means of actuating the tripping mechanism by which the binder is started when the proper amount of grain has been collected to form a bundle; hinged boards or tables E, located at the lower edge of the binding-table to assist in retaining the grain in position thereon until the binding operation has been completed; a breast-plate or shield, F, maintained by overhanging supports at a suitable distance above the table to assist in directing and compressing the grain; a rotary knot-tying head, G, located above the breast-plate; a cord-placing and knife-bearing arm, H, arranged to vibrate at one end past the knotter; a vibratory tucker-arm, I, to assist in placing the cord in position; a cord-clamping wheel, J, mounted on a movable support in order that it may approach the tyer and slacken the cord during the formation of the knot; a main shaft, K, supported horizontally above the breast-plate and carrying the various cams and wheels from which motion is communicated to the minor parts of the tying and cutting devices, as hereinafter explained, all as shown in Fig. 7, and as shown in Fig. 2; a vibratory cord controlling and slackening arm, L; and binder-operating mechanism which is thrown into action by automatic devices, as hereinafter explained.

Except in the particulars hereinafter specified, the above parts are all of ordinary construction, and operate in substantially the same manner as in the Appleby machine hitherto in use.

All of the operative parts of the binder proper are sustained by what is denominated as a "binder-frame." This frame, instead of being constructed on the plan hitherto employed, I now make in the form represented in Figs. 2, 3, 7, and 12. The frame consists of two parallel cast-metal bars or plates, N, provided with bearings *a b c* to receive the various shafts hereinafter specified. The plates are constructed with side flanges in order to give them strength and lightness, and are provided with bearings *d*, adapted to receive the cross rails or bars *e*, upon which they will be firmly bolted or supported. One of the plates N has firmly bolted to its upper surface an upright standard or bracket, O, the upper end of which extends at right angles to the main body, overhangs the binder-table, and is made of tubular form, as shown at *f*, Fig. 3, to receive the main shaft K of the binder. The main frame has the bearings *c*, which receive the shaft for driving the compressors, provided with removable half-boxes, as shown in Fig. 3, in order to permit the ready removal and insertion of said shaft without disconnecting or removing the other parts of the machine.

The packer-arms B, which ascend through the slotted table to advance and compact the grain, are sustained, as shown in Fig. 7, at their lower ends by swinging links *h*, and at their upper ends by cranks *i*, formed upon the rotary shaft P, which is mounted in the half-boxes of the main frame just mentioned. The manner of hanging and operating the packer-arms is not claimed. The outer end of the packer-arm shaft P is provided with a driving-head, Q, and with a loose pinion, R, which receives motion from the driving-head whenever the parts are thrown into action by the devices operated by the pressure of the accumulating grain. These devices will now be described.

A horizontal rock-shaft, S, lying beneath the binding-table, has firmly secured to it the needle or binder arm C, the motion of the shaft at proper times causing the point of the binder-arm to be projected upward through the table and passed around the grain to present the cord to the tying devices, as usual. On the rock-shaft which carries the binder-arm, by the side of but independently of said arm, I secure a hub or crank arm, T, to the outer end of which I connect by a horizontal pivot a vertical vibrating arm, U, carrying in its upper side a reciprocating plate, V, to which the compressor-arms D, before mentioned, are secured. The vibrating arm U is sustained at its free end by means of a link, W, from an arm, X, on a horizontal rock-shaft, Y. The shaft Y extends horizontally beneath the table to the rear end of the binder, where it is provided with a crank-arm, Z. The crank-arm Z is connected by a spring-link connection, A', to a swinging arm, B', provided with a roller which travels in a cam-groove, C', this groove being formed in the main gear-wheel D', attached to the outer end of the main binder-shaft, as plainly represented in the various figures. Under the above arrangement of parts motion is communicated from the groove in the wheel D' through the intermediate parts to the bar or arm U, causing the latter to swing upward and downward in order to present the compressor-arms first in position to act upon the grain, and afterward to turn them downward out of the way in order that the bundle may be passed over them and discharged from the machine. It will be observed that the arm U, upon which the compressing devices are sustained, is entirely independent of the needle or binder arm, having a separate connection with the supporting-shaft S.

To the sliding plate V, which supports the compressor-arms, I connect, as shown in Fig. 7, a chain, F', attached to a crank-arm, E', on one end of a horizontal rock-shaft, G'. The shaft G' extends horizontally beneath the table to the rear end of the binder, where it carries an arm, H', the purpose of this arm being to operate the "trip mechanism," so called, or, in other words, the mechanism by which the binding devices are set in action. The driving-gear connected with this trip mechanism is of the same or substantially the same character as that in the original Appleby machine, the mechanism being operated to set the binder in action by means of an arm or lever, I', which rests against a dog or stop, J', in the driving-gear. The elevation of the arm I' causes its disengagement from the stop J', whereupon the binder is set in motion, as in the original machine. In the original machine, however, the dog, arm, or stop-lever I' was elevated, and thereby released from the stop J' by means of a finger acting near its heel or shank, while in the present machine I have arranged the finger H' to operate beneath the arm I', near the upper or free end of the latter. In this manner I am enabled to apply the power more readily and to greater advantage for releasing the trip mechanism, and thus to secure the starting of the binder with certainty, although the other parts may be subjected to a strong strain, as frequently happens when the grain receives a severe compression. The arm I' is mounted loosely around the outer end of the shaft S, which carries the binder arm, as before mentioned, and is attached thereto in the manner represented in Figs. 2 and 5, the inner end of the arm I' being divided or made in the form of half-boxes, which are bolted together around the shaft, as shown. This construction permits the arm to be disconnected and removed by drawing it out endwise between them without removing the shaft or disconnecting the other parts. In the operations of the machine it occasionally happens that the arm I' will break and require to be replaced by another.

In the original machines the arm had a solid end mounted upon a supporting-shaft, the construction and arrangement being such that it was necessary to disconnect the various parts and withdraw the shaft endwise in order to apply a new arm. For this reason the construction represented in the drawings is of importance.

The important feature of the invention as regards the attachment of this frame to the shaft consists in adapting the same to be removed endwise in a direction transverse to the axis of the shaft, the use of the half-boxes being a secondary matter. Any equivalent attachment to the arm which will admit of its being withdrawn in the direction stated will answer the same purpose.

The binder-arm shaft S receives its rocking motion, in the manner represented in Fig. 2, by means of a crank, K', applied to its rear end, and connected by a pitman, L', with a wrist or crank pin on the main gear-wheel D', before mentioned. Motion is transmitted, as in the Appleby machine, to the wheel D' by means of intermediate pinions, M' and N', from the before-mentioned pinion R on the shaft P. During the time that the grain is being delivered and compacted to form the bundle the parts stand in the position represented in Fig. 2. When the amount of grain has reached the required limit its pressure forces the compressor-arms D downward, thereby moving the plate V and causing the chain F' to transmit motion to the shaft G', which in turn operates the trip-arm I' at the rear of the machine, thereby releasing the dog J' and throwing into motion the gear for operating the binder-arm and cord-fastening devices.

For the purpose of controlling the delivery of the cord—that is to say, taking up and slackening the same at the proper times—I employ a vibratory take-up arm, L, before mentioned. This arm is pivoted to the rear end of the binder-frame, as shown in Fig. 2, and is raised and lowered at the proper times by means of the arm K', which acts beneath a plate, P', bolted to the arm, as shown in Fig. 2. The arm K', which is the same that transmits motion to the binder-arm, acts against the plate P' during its vibratory motion, and thereby serves to raise and lower the take-up arm as required. The take-up arm, separately considered, I do not claim, the invention in this regard consisting in the peculiar means of imparting motion thereto.

After being bound the grain is discharged from the machine by rotary delivery-arms Q', attached to the main shaft K, as clearly represented in Fig. 1. The original Appleby machine was provided with two of these arms, operating one at the butts and the other at the middle portion of the grain. In practical operations with the Appleby machine it has been found that difficulty has been experienced in effecting the separation and delivery of the bundles by means of the two arms. To overcome these difficulties I extend the main shaft K over the forward portion of the binding-table, and apply thereto a third delivery-arm, Q'', arranged in such position as to act upon the grain at or near the heads of the same, the three arms being arranged in line or substantially in line with each other. The additional arm Q'' is found to serve an important and effective purpose in separating and disconnecting the grain at the heads, so that each bundle is delivered from the machine without difficulty, and the successive bundles prevented from clinging to each other, as frequently happens in the use of the ordinary machines. In order to permit the application of this third delivery-arm in position to act upon the heads of the grain, I find it necessary to reverse the ordinary arrangement of the bracket or standard by which the main shaft K is carried—that is to say, instead of having the arm overhang the binding-table from the rear side, or side on which the heads of the grain are delivered, I extend it over the table from the opposite side, as shown in the drawings. By thus arranging the arm I am permitted to extend the shaft K to the required distance beyond the supporting-standard and cam-wheel S' to receive the arm Q'' in position to act upon the heads of the grain. In machines having the standard arranged, as in the Appleby patent, with the standard overhanging the rear edge of the table, it is impossible to apply a delivery-arm in position to act upon the heads, for the reason that it would necessitate the cutting off or shortening of the overhanging end of the bracket or standard in such manner that suitable support could not be given to the main shaft and its cam S'.

In order to prevent the delivery-arms from being turned backward accidentally, I provide the main cam-wheel S', which will be hereinafter described, on its side face with a tooth or shoulder, T', as shown in Fig. 1, and attach to the overhead brace of the binder-frame the spring-pawl U', the parts being so arranged that at the instant the arms cease their motion after discharging the bundle, the pawl engages behind the shoulder and prevents them from moving backward.

I am aware that stop devices have been employed to lock the delivery-arms in position; but the peculiar device represented is found to be cheaper and to answer a better purpose than those hitherto employed. The spring I ordinarily attach to the overhead members by which the bracket or standard is usually sustained.

Passing next to the devices by which the tying, cutting, and holding of the cord are effected, reference is made particularly to Figs. 1, 7, 8, and 13.

To the breast-plate F there is bolted an upright or standard, V', mortised in its upper end to admit a cam-wheel or hub, W', and provided with openings or bearings, as shown in Fig. 8, on opposite sides of the mortise for the passage of the main shaft K. In one side the standard V' is provided with an opening, g, to admit the pinion of the tyer-spindle, as shown in Figs. 7 and 8. Heretofore the spindle has received support from bearings formed entirely on one side of the spindle, rendering it necessary to construct the parts both thick and heavy. By constructing the frame in the peculiar form shown, with an opening to admit the pinion, so that the supporting-spindle will extend downward on both sides of the pinion, I am enabled to reduce the weight and at the same time give the pinion a firm support. The tyer-pinion receives an intermittent motion from teeth formed on the side face of the main cam-wheel S', which is also provided with stop or delay surfaces to hold the pinion and tyer at rest, as in the original machine.

For the purpose of severing the cord at the proper time, and of sustaining the cord above the tying-bills until grasped thereby, I make use of a vibratory cord-placing and knife-carrying arm, H, somewhat similar to that employed in the Appleby machines. Instead, however, of constructing the arm in the original form, I make the same in the peculiar form represented in Fig. 9, with the guard or lip h extending inward and overhanging the notch in which the cord rests. This overhanging end supports the cord and carries it inward over the knotting mechanism in such manner that there is no possibility of its falling past the same. In addition to this feature of improvement I also turn the upper edge of the guard h inward toward or above the knot-tyer, as represented in Figs. 9 and 13. This inward extension serves to throw the cord inward or backward behind the bills of the tying-head, so that there is no possibility of their failing to grasp the same. This cord-placing arm also carries the knife or blade m, by which the severance of the cord is effected.

The tying-bill, which is plainly represented in Figs. 6, 7, and 13, is provided, as in the Appleby machine, with a pivoted jaw or finger, the heel of which is provided with a roller acted upon by a stationary spring for the purpose of closing the jaw. The tension of this spring determines the firmness of the hold taken by the tyer upon the cord, and upon the proper adjustment of this tension the proper formation of the knot is largely dependent. In the original machine the spring was secured in place by a single screw, and great difficulty was experienced in securing and maintaining the exact adjustment demanded. To remedy this difficulty I now attach the spring, as shown in Figs. 6 and 8, by means of two screws, O, to the side of the standard, the one serving to hold the spring securely in place, while the other serves as a means of increasing or diminishing its tension.

As in the Appleby machine, I make use of a pivoted vibratory arm, I, frequently known as the "tucker-arm," lying above the tying-head, and the office of which is, as in the other machines, to force the ends of the cord downward within reach of the clamping device. This arm forms no part of my invention. In order to secure a more effectual operation of the arm and insure its engagement above the cord, I provide the binder-arm C, near its point, with a notch or recess, r, as clearly represented in Fig. 7, through which the point of the tucker-arm passes in the act of seizing the cord, the binder-arm being at such time in its elevated position, with its point in immediate proximity to the tying devices.

Hitherto much difficulty has been experienced in mounting the vibratory tucker-arm p in such manner as to prevent it from being thrown out of position by the severe strains to which it was subjected. It has been ordinarily attached to the top of the breast-plate by a bolt or equivalent fastening. In order to overcome the difficulties incident to the old method of attachment, I now cast upon one side of the breast-plate F an upright half-box, s, plainly represented in Figs. 8 and 14. As shown in Fig. 14, the tucker-arm is provided with a shaft and operating-crank, the shaft being seated in the half-box s, and secured by a corresponding half-box bolted over and around it, as shown. The vibratory motion is imparted to the tucker-arm by means of its crank-arm engaging in the groove of the main cam-wheel S', as in the original machine.

In order to facilitate and insure the proper adjustment of the wheels, cams, and arms carried by the main shaft, and to prevent them from being turned out of their proper relative positions, the shaft is provided with a longitudinal groove in one side, and the wheels D' and S', the cam W', and the delivery-arms each provided with a feather or spline to enter the groove.

In order to facilitate the attachment and detachment of the delivery-arms Q' and Q'', they have half-boxes formed upon their ends, and are secured by corresponding half-boxes or caps bolted firmly to them, as shown in Fig. 1, said parts being thus drawn together tightly around the shaft.

The clamping and holding of the end of the cord are effected by means of a rotary clamping-wheel, J, mounted upon a rocking plate between the two ears on the under side of the standard V'.

The moving of the rocking-plate upon which the cord-clamping wheel J is mounted is effected by an eccentric portion formed upon one end of the hub or cam-wheel W'; but this feature constitutes no part of my invention.

Figure 16:
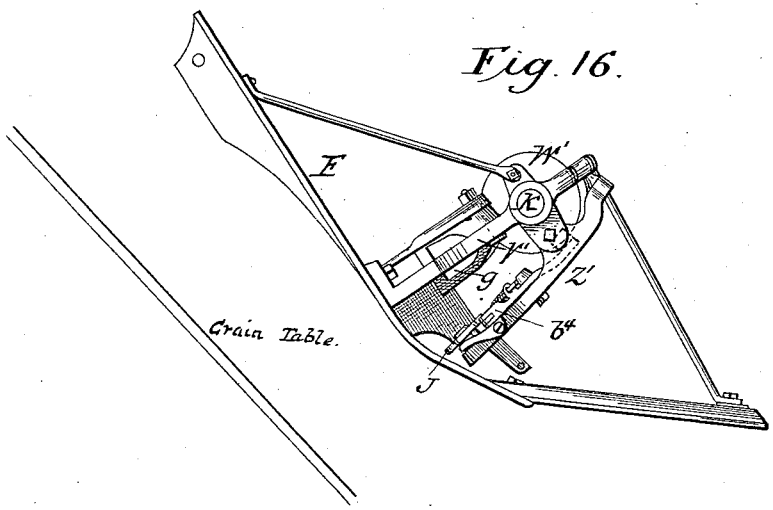

For the purpose of rotating the clamping-wheel intermittingly, that it may grasp and hold the cord, I employ in place of the complicated mechanism hitherto in use the arrangement represented in Figs. 15 and 16. The clamping-wheel J, of ordinary construction, is provided with a ratchet-wheel on one side. This ratchet-wheel is driven by a pawl, $a''$, attached to a vibratory lever, $b^4$, which latter is pivoted upon the vibrating plate Z', which carries the wheel J. The upper end of the lever is seated in and vibrated by means of a cam-groove formed in the periphery of the wheel or hub W', so that the rotation imparts a vibratory motion to the lever, which in turn, through its pawl, imparts an intermitting rotary motion to the clamping-wheel. The cam-groove is made straight, or, in other words, extended in the plane of rotation through a portion of its length, in order to permit the lever and clamping-wheel to remain at rest during the proper intervals. It will be observed that the wheel or hub W' serves both to rock the plate Z' and to rotate the clamping-wheel thereon. The action of the cam upon the rocking plate is not of my invention, and is not claimed herein.

In order to secure the application of the band at the middle of the grain in all cases, the latter varying in length, I arrange the binder to move lengthwise upon the harvester-frame, as in other machines. As a simple and secure method of thus supporting the movable binder, I extend the rods $e$, which are bolted firmly to the binder, to a suitable length, and mount them in brackets or standards $t$, which are bolted to the harvester-frame, and provided in their upper ends with rollers $u$, upon which the rods or rails $e$ of the binder-frame travel. The best results are secured when the rods $e$ are made of cylindrical form or of gas-pipe, and the supporting-rolls provided with rounded grooves to correspond, as shown.

I am aware that a shifting binder has been sustained upon rollers, and I therefore make no claim thereto.

In this class of machines as heretofore made the compressor-arms D have been usually curved upward or forward toward the incoming grain to assist in giving form to the bundle. The arms thus curved cause frequent annoyance on account of their liability to become engaged in the bundles, interfering with their discharge. In order to avoid this difficulty, I curve the compressor-arms D downward or outward, as shown in Fig. 7, the convex side of the arms being presented toward the incoming grain. When made in this form the arms permit the bound bundles to escape without difficulty.

In order to prevent the grain from becoming entangled with the chain F', which connects with the compressor, I provide the face of the binding-table with a raised hub or guard, $v$, as clearly shown in Figs. 1 and 7, this guard serving to sustain the grain above the chain.

In order to admit of the machine being adjusted to produce automatically bundles of any desired size, the compressor-arms D are made adjustable lengthwise upon the plate V. They may be attached in any suitable manner; but the most simple plan is that represented in the drawings, the compressor-arms being secured by means of a bolt to the plate, which is provided with a series of holes to admit of the bolt and compressor-arms being adjusted upward and downward thereon.

The vibratory binder-arm or needle C, instead of having its guard $d''$ made concentric from point to heel, is given a slight outward curvature or eccentricity toward the point. On the under side of the breast-plate guards or ribs $b''$ are provided along the opposite sides of the opening, through which the point of the needle-arm passes. These guards are cut away or curved on the under side in such manner that at the instant the needle-arm passes between them in separating the gavel from the loose grain the lower edges of the rib and the inner edge of the needle will coincide and form a continuous curved surface to act upon the grain, so that there is no tendency of the point of the needle to crowd the grain upward through the slit in the breast-plate.

The operation of the machine is as follows: The parts stand normally in the position represented in Figs. 1 and 2, the binding mechanism proper being held at rest by means of the trip-arm I', as shown in Fig. 2, while the packer-arms B continue in motion to deliver the grain between the grain-table and the breast-plate F against the compressor-arms D. When a sufficient amount of grain has accumulated to form a bundle its pressure causes the compressor-arms D to move downward, sliding the plate V upon the supporting-arm U, and causing the chain F' to transmit motion through the crank-arm to the rock-shaft G', the latter in turn, through the arm H' on its rear end, elevating the trip-arm I', causing the binding mechanism to be set in motion. As soon as this occurs the main shaft commences its rotation, revolving the discharge-arms in the direction indicated by the arrow. At the same time the binding or needle arm C swings upward through the grain, carrying the cord around the binder-arm, the arm or hub T draws the plate U, causing the compressor-arms D to be carried upward toward and against the grain, which is thus compressed between said arms and the binder-arm. As soon as the binder-arm has presented the cord in the vicinity of the tyer-head the tucker-arm I swings downward, pushing the strands of the cord against the end of the vibratory cord-placing arm H, which retains the cord in position to be operated by the tyer-head. The tyer-head immediately revolves to form the knot in the cord in a manner well understood to those familiar with the art, and as this knotting operation is completed the cord-placing arm H swings laterally, withdrawing the loop from the tyer-head and at the same time severing the cord, thus completing the operation of binding the bundle. At this moment the arm U swings downward, carrying the compressor-arms out of the way, so that the bundle may be discharged over the lower edge of the binding-table by means of the discharge-arms Q' and Q'', as usual.

The present invention is restricted to those matters and things which are specifically claimed herein. As to any and all features, devices, and combinations of devices which may be described and shown, but which are not specifically claimed, the right is reserved to make the same the subject-matter of a separate patent.

Having thus described my invention, what I claim is—

1. The binder-frame consisting of the two cast-metal sills N, constructed in the form and with the shaft-bearings as shown, and the overhanging arm or standard O, bolted to one of said sill-pieces, as shown and described.

2. In a binder-frame, the combination of the cast-metal sills N, constructed and arranged as shown, with seats in their under sides, the cross-bars e, secured and seated within said seats, and the standard O, secured to one of said sills, as shown.

3. The vertically-swinging arm U, having the sliding compressor mounted thereon, in combination with the rock-shaft G', having two arms, one connected with the compressor and the other arranged to act upon the trip-arm for starting the binding mechanism, as shown.

4. The rock-shaft S, having the binder-arm attached, in combination with the arm or hub T, secured to the shaft independently of the binder-arm, the arm U, pivoted to the hub, the compressors sliding upon said arm, and means, substantially as described, for operating said arm U and the compressor.

5. The vertically-swinging arm U, in combination with the reciprocating plate thereon and the compressor mounted on said plate.

6. In combination with the rotary tyer-head, the cord-placing arm having the extended end with its edge extended inward toward the knotting-hook, substantially as represented at h, whereby it is adapted to present the cord with certainty to the tying-fingers.

7. In combination with the rock-shaft Y, having crank-arms at both ends, the cam-wheel D', connected by a lever and yielding coupling with one of said crank-arms, the vertically-swinging arm U, connected with the other of said arms, the compressor arranged to slide upon the arm, as shown, and a spring attachment tending to slide the compressor upward.

8. In combination with the trip-arm I', arranged and operating in the connection described, the vibratory lifting-finger H', having its free end arranged to act beneath the free end of the trip-arm near its extremity, as shown.

9. The combination of the cord-controlling arm L and the crank-arm K', applied to the binder-arm shaft and arranged to act upon and raise the arm L, as described and shown.

10. In combination with the rotary tyer-head having the pivoted jaw, the co-operating spring, and the two screws applied to the spring in the manner described and shown, whereby the tension of the spring may be accurately adjusted and its proper position maintained.

11. The improved breast-plate for a grain-binder, having the upright box or bearing s cast rigidly thereon, as and for the purpose described.

12. The standard V, constructed, as shown, with the opening g to receive the tyer-pinion, the sustaining-arms extending downward past both sides of the pinion to sustain the lower end of the tyer-spindle, as set forth.

13. In a grain-binder having the peculiar driving and trip mechanism described, the trip-arm I, secured to its horizontal shaft by means, substantially as described, adapted to permit the arm to be removed from the shaft by an endwise motion at right angles to the axis of the shaft, as and for the purpose described.

14. In combination with the tyer-head, the vibratory cord-placing arm having the cord-receiving notch, and the arm h, overhanging said notch, as described and shown.

15. The cord-placing arm H, having the notched T-shaped end, as described and shown.

16. In combination with the grooved cam-wheel W', the rocking plate Z', pivoted at a point near said wheel, the cord-clamping wheel J, mounted upon said plate, and the ratchet-lever $b^4$, mounted upon said plate and engaging at one end directly in the cam-wheel, as described and shown, whereby motion is communicated directly from the cam-wheel to the ratchet-lever and the rocking of the plate permitted without disconnecting the wheel and lever.

17. In a grain-binder, the combination of the binding-table or receiver, the mechanism whereby the grain is delivered to said table in a continuous stream, mechanism, substantially as shown, for gaveling and binding the grain, and a rotating arm, substantially as described, arranged to act at the heads of the grain to separate the gavel from the loose grain and discharge the bundle from the machine, whereby the bundles are prevented from clinging to the grain upon the machine and being carried therewith.

18. In a grain-binder, the upright standard or bracket overhanging the binding-table from the front side, or side on which the butts of the grain are received, in combination with the intermittingly-rotated shaft mounted therein, and provided with the rotary delivering-arms Q' Q', arranged to act upon the bundles upon opposite sides of and adjacent to the applied band, and the third delivery-arm, Q'', arranged to act upon the grain at the head.

19. The vertically-swinging compressor-arms, having their upper ends curved downward to facilitate the discharge of the bound bundles.

20. In combination with the main shaft K, having the discharge-arms thereon, the wheel S, provided with the shoulder T', and the spring-pawl U', mounted on the brace and arranged to engage with said shoulder, as described, whereby backward motion of the discharge-arms is prevented.

GEORGE ESTERLY.

Witnesses:
W. C. DUVALL,
PHILIP T. DODGE.